United States Patent
Yoshimi

(10) Patent No.: US 10,389,945 B2
(45) Date of Patent: Aug. 20, 2019

(54) IMAGING CONTROL APPARATUS, CONTROL METHOD FOR THE SAME, AND STORAGE MEDIUM

(71) Applicant: CANON KABUSHIKI KAISHA, Tokyo (JP)

(72) Inventor: Takashi Yoshimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/851,368

(22) Filed: Dec. 21, 2017

(65) Prior Publication Data

US 2018/0184009 A1 Jun. 28, 2018

(30) Foreign Application Priority Data

Dec. 28, 2016 (JP) ................................. 2016-255238

(51) Int. Cl.
*H04N 5/232* (2006.01)

(52) U.S. Cl.
CPC ..... *H04N 5/23293* (2013.01); *H04N 5/23212* (2013.01); *H04N 5/23216* (2013.01); *H04N 5/23296* (2013.01); *H04N 5/232935* (2018.08); *H04N 5/232945* (2018.08)

(58) Field of Classification Search
None
See application file for complete search history.

(56) References Cited

U.S. PATENT DOCUMENTS 8,717,477 B2 * 5/2014 Oogami ............. H04N 5/23293
348/333.01

FOREIGN PATENT DOCUMENTS

JP H05150291 A 6/1993

* cited by examiner

*Primary Examiner* — Mark T Monk
(74) *Attorney, Agent, or Firm* — Canon U.S.A., Inc. IP Division

(57) ABSTRACT

A set magnification of a magnified view during imaging standby and a set magnification of a magnified view in an AF-plus-MF mode are compared to determine whether the magnification of the magnified view during imaging standby is higher than the magnification of the magnified view in the AF-plus-MF mode. As a result of the determination, if the magnification of the magnified view during imaging standby is lower than or equal to the magnification of the magnified view in the AF-plus-MF mode, a live-view image is displayed at a magnification equal to the magnification set for the AF-plus-MF mode. If the magnification of the magnified view during imaging standby is higher than the magnification of the magnified view in the AF-plus-MF mode, the live-view image is displayed at a magnification equal to the magnification at which the live-view image has been displayed during imaging standby.

13 Claims, 11 Drawing Sheets

FIG. 9A

| SETTING OF MAGNIFICATION FOR AF+MF MODE | MAGNIFICATION OF MAGNIFIED VIEW DURING IMAGING STANDBY | MAGNIFICATION OF MAGNIFIED VIEW IN AF+MF MODE |
|---|---|---|
| ×1 | ×1 | ×1 |
|  | ×5 | ×5 |
|  | ×10 | ×10 |
| ×5 | ×1 | ×5 |
|  | ×5 | ×5 |
|  | ×10 | ×10 |
| ×10 | ×1 | ×10 |
|  | ×5 | ×10 |
|  | ×10 | ×10 |

FIG. 9B

| MAGNIFICATION OF MAGNIFIED VIEW DURING IMAGING STANDBY | MAGNIFICATION OF MAGNIFIED VIEW IN AF+MF MODE |
|---|---|
| ×1 | ×5 |
| ×5 | ×10 |
| ×10 | ×10 |

FIG. 9C

| SETTING OF MAGNIFICATION FOR AF+MF MODE | MAGNIFICATION OF MAGNIFIED VIEW DURING IMAGING STANDBY | MAGNIFICATION OF MAGNIFIED VIEW IN AF+MF MODE |
|---|---|---|
| DISABLED | ×1 | ×1 |
|  | ×5 | ×5 |
|  | ×10 | ×10 |
| ×10 | ×1 | ×10 |
|  | ×5 | ×10 |
|  | ×10 | ×10 |

FIG. 9D

| SETTING OF MAGNIFICATION FOR AF+MF MODE | MAGNIFICATION OF MAGNIFIED VIEW DURING IMAGING STANDBY | MAGNIFICATION OF MAGNIFIED VIEW IN AF+MF MODE |
|---|---|---|
| ×1 | ×1 | ×1 |
|  | ×5 | ×5 |
|  | ×10 | ×10 |
| ×2 | ×1 | ×2 |
|  | ×5 | ×10 |
|  | ×10 | ×20 |
| ×4 | ×1 | ×4 |
|  | ×5 | ×20 |
|  | ×10 | ×40 |

IMAGING CONTROL APPARATUS, CONTROL METHOD FOR THE SAME, AND STORAGE MEDIUM

BACKGROUND

Field of the Disclosure

The present disclosure relates to an imaging control apparatus suitable in particular for use in magnified live-view display, a control method for the imaging control apparatus, and a storage medium.

Description of the Related Art

Portable electronic devices having an imaging function, such as digital cameras, are capable of collecting light from a subject by using an imaging lens to form an image on an imaging element such as a charge-coupled device (CCD) sensor, saving image data in a recording medium, and reproducing the recorded image data to display an image on an image display unit. Some digital cameras have a mode for displaying a subject image on the image display unit in real time, called a live view imaging mode which allows a photographer even using a digital camera having no optical viewfinder to capture an image while viewing the framing of the image by using the image display unit. In this case, the photographer is also able to zoom in on an image that falls within a preset display frame to verify whether the focus is on a subject while viewing the displayed image.

Recently, there have been techniques for digital cameras capable of switching the focus adjustment operation mode to an automatic focus or auto-focus (AF) adjustment mode (hereinafter, an AF mode) or a manual focus (MF) adjustment mode (hereinafter, an MF mode). Japanese Patent Laid-Open No. 5-150291 discloses a video camera having an imaging assistance function for temporarily switching the video camera to the MF mode in response to an operation of changing the focal length after the video camera has prepared to capture an image in the AF mode. There is also available a camera having a function of magnifying an image at a preset magnification for fine focus adjustment when the camera is temporarily switched to the MF mode. Combining the operations described above allows rapid switching from the AF mode to the MF mode, and, additionally, an image is displayed in magnified form for focus adjustment, which enables a user to capture the image while comfortably switching between the AF mode and the MF mode.

When the camera is switched to the MF mode from the AF mode in which an image has been magnified, an object or objects appearing in the image that is magnified at a predetermined magnification in accordance with the switching to the MF mode may be smaller than the object or objects appearing in the image magnified before switching to the MF mode if the predetermined magnification is lower than the magnification at which the image has been magnified in the AF mode. In this case, it is difficult for the user to verify whether the MF operation has provided finer focus adjustment than the AF operation, which may hinder imaging experience when using this function.

SUMMARY

The present disclosure provides a technique for allowing a user to comfortably capture images by using an imaging assistance function that allows temporary switching to the MF mode.

An imaging control apparatus according to an aspect of the present disclosure includes a magnification instruction unit configured to provide an instruction to magnify a live-view image obtained by an imaging unit, a manual focus operation unit configured to receive an operation of manually adjusting focus, and a control unit. The control unit is configured to perform control to display the live-view image in magnified form at a first magnification in response to the instruction provided by the magnification instruction unit, and to perform control to, in response to the manual focus operation unit receiving the operation, display the live-view image at a higher magnification among the first magnification and a second magnification, the second magnification being determined in advance as a magnification at which the live-view image is displayed in response to the manual focus operation unit receiving the operation.

An imaging control apparatus according to another aspect of the present disclosure includes a magnification instruction unit configured to provide an instruction to magnify a live-view image obtained by an imaging unit, a manual focus operation unit configured to receive an operation of manually adjusting focus, and a control unit. The control unit is configured to perform control to display the live-view image in magnified form at a first magnification in response to the instruction provided by the magnification instruction unit, and to perform control to display the live-view image at a higher magnification than the first magnification in response to the manual focus operation unit receiving the operation.

An imaging control apparatus according to still another aspect of the present disclosure includes a magnification instruction unit configured to provide an instruction to magnify a live-view image obtained by an imaging unit, a manual focus operation unit configured to receive an operation of manually adjusting focus, a setting receiving unit configured to receive a setting indicating whether to display the live-view image in magnified form at a highest magnification in response to the manual focus operation unit receiving the operation, and a control unit. The control unit is configured to perform control to display the live-view image in magnified form at a first magnification in response to the instruction provided by the magnification instruction unit, and to perform control to, in response to the manual focus operation unit receiving the operation, display the live-view image at the first magnification when the setting received by the setting receiving unit does not indicate that the live-view image is displayed in magnified form at the highest magnification, and display the live-view image at the highest magnification when the setting received by the setting receiving unit indicates that the live-view image is displayed in magnified form at the highest magnification.

An imaging control apparatus according to still another aspect of the present disclosure includes a magnification instruction unit configured to provide an instruction to magnify a live-view image obtained by an imaging unit, a manual focus operation unit configured to receive an operation of manually adjusting focus, and a control unit. The control unit is configured to perform control to display the live-view image in magnified form at a first magnification in response to the instruction provided by the magnification instruction unit, and to perform control to, in response to the manual focus operation unit receiving the operation, display the live-view image at a magnification obtained by multiplying the first magnification by a second magnification, the second magnification being determined in advance as a magnification at which the live-view image is displayed in response to the manual focus operation unit receiving the operation.

Further features of the present disclosure will become apparent from the following description of exemplary embodiments with reference to the attached drawings.

BRIEF DESCRIPTION OF THE DRAWINGS

FIGS. 9A to 9D are diagrams illustrating relationships according to embodiments between magnifications of a magnified view during imaging standby and magnifications of a magnified view in the AF-plus-MF mode.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

First Embodiment

An exemplary embodiment of the present disclosure will be described in detail hereinafter with reference to the accompanying drawings.

Figure 1:
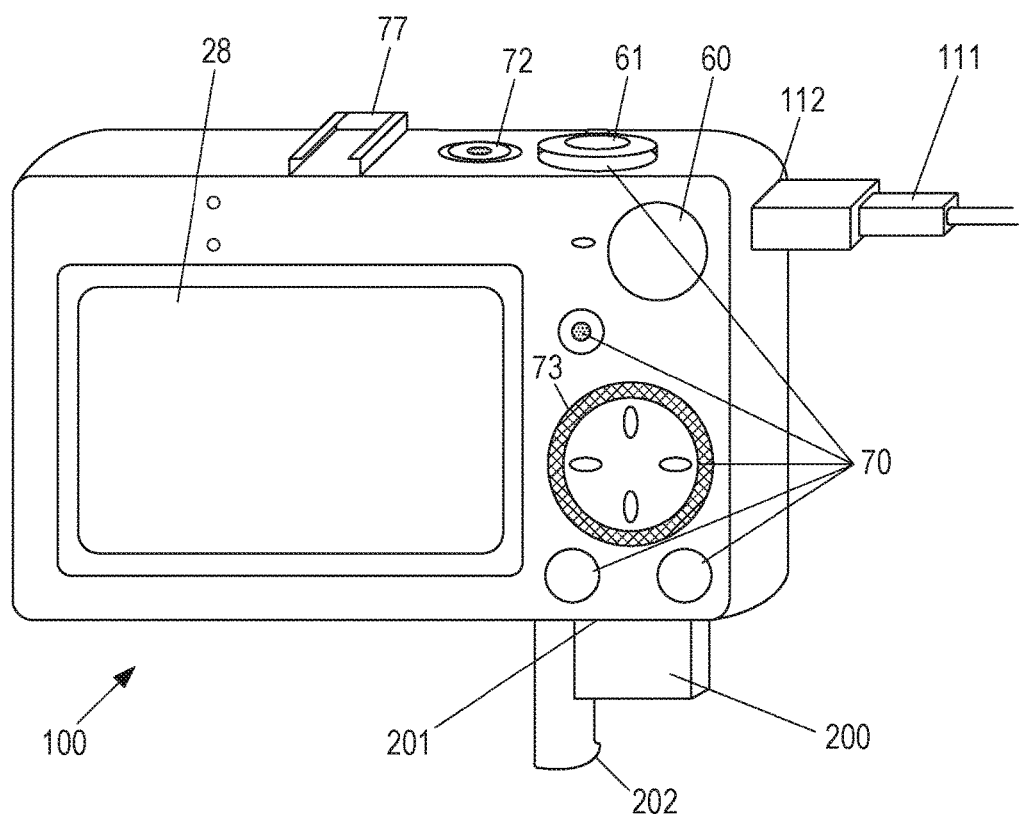
FIG. 1 is a diagram illustrating an example external configuration of a digital camera according to an exemplary embodiment.

FIG. 1 illustrates an example external configuration of a digital camera 100. The digital camera 100 is an example of an imaging control apparatus according to this embodiment. A display unit 28 is a display unit that displays an image or various kinds of information. The display unit 28 is formed of a touch panel and is capable of sensing touch on the display unit 28. A shutter button 61 is an operation unit for providing an instruction to capture an image.

A mode dial (mode selection switch) 60 is an operation unit for switching between various modes. A connector 112 is a connector that connects the digital camera 100 to a connection cable. An operation unit 70 is an operation unit including operation members for receiving various operations performed by a user, such as various switches, buttons, and a touch panel. A controller wheel 73 is a rotatable operation member included in the operation unit 70. A power switch 72 is a switch for switching between power-on and power-off states.

A recording medium 200 is a recording medium such as a memory card or a hard disk. A recording medium slot 201 is a slot for accommodating the recording medium 200. The recording medium 200, when accommodated in the recording medium slot 201, is capable of communicating with the digital camera 100. A lid 202 is a lid of the recording medium slot 201. An accessory shoe 77 serves as a connector through which a digital camera external connection device such as an external strobe unit or an external electronic viewfinder is connected to the digital camera 100.

Figure 2:
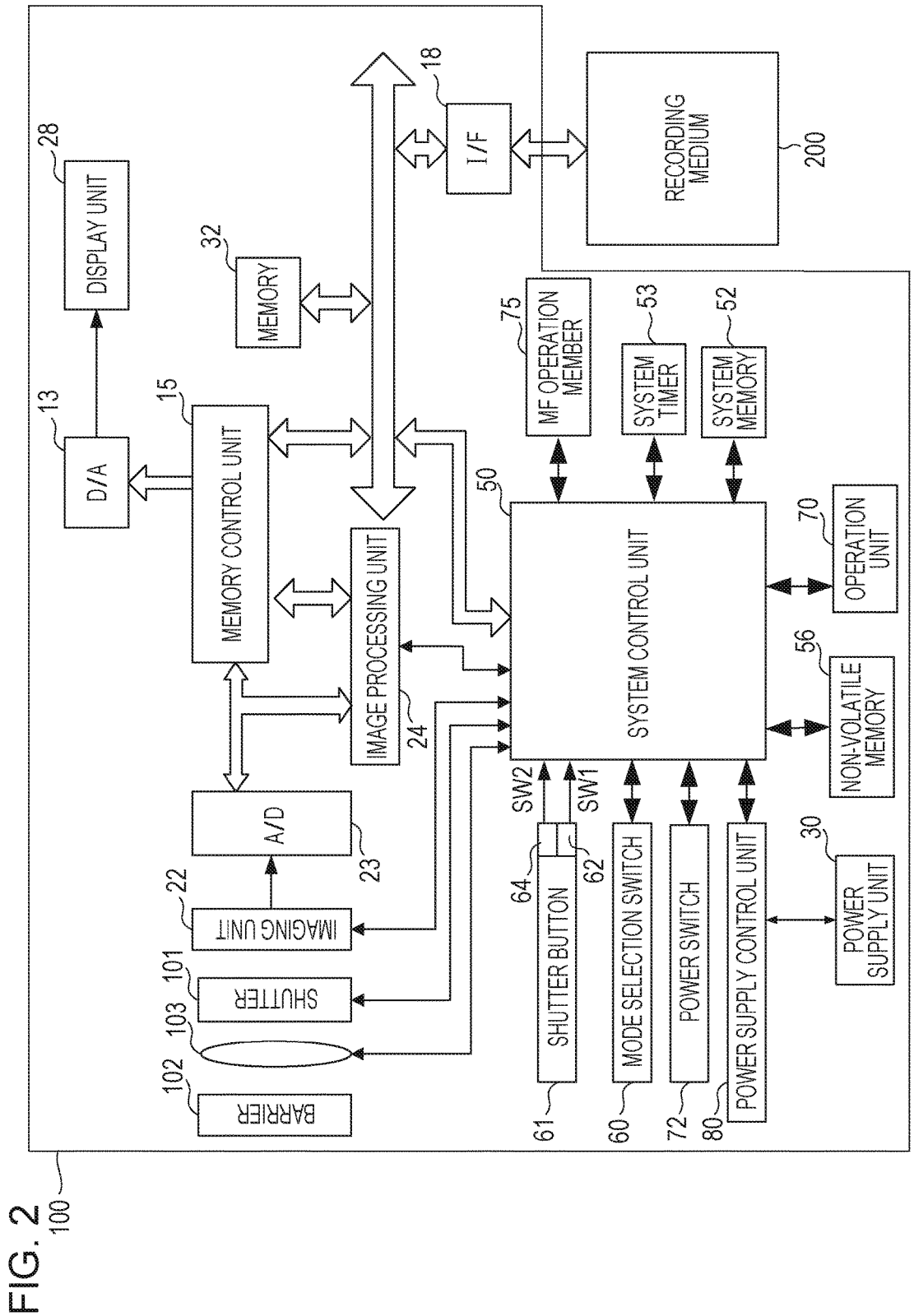
FIG. 2 is a block diagram illustrating an example internal configuration of the digital camera according to the exemplary embodiment.

FIG. 2 is a block diagram illustrating an example internal configuration of the digital camera 100 according to this embodiment.

In FIG. 2, an imaging lens 103 is a lens group including a focusing lens, and a shutter 101 is a shutter having an aperture function. An imaging unit 22 is constituted by a CCD sensor, a complementary metal oxide semiconductor (CMOS) element, or any other device for converting an optical image into an electrical signal. An analog-to-digital (A/D) converter 23 converts an analog signal into a digital signal. The A/D converter 23 is used to convert an analog signal output from the imaging unit 22 into a digital signal. A barrier 102 covers an imaging system of the digital camera 100, including the imaging lens 103, to protect the imaging system, including the imaging lens 103, the shutter 101, and the imaging unit 22, against stains or damage.

An image processing unit 24 performs predetermined pixel interpolation, resizing such as size reduction, or color conversion on data obtained from the A/D converter 23 or on data sent from a memory control unit 15. The image processing unit 24 further performs predetermined calculation processing using image data obtained through an imaging operation. On the basis of the result of the calculation, a system control unit 50 performs exposure control and distance measurement control. As a result, through-the-lens (TTL) auto-focus (AF) processing, auto-exposure (AF) processing, and pre-flash (EF) processing are performed. The image processing unit 24 also performs predetermined calculation processing using image data obtained through an imaging operation and performs TTL auto white balance (AWB) processing on the basis of the result of the calculation.

The output data obtained from the A/D converter 23 is directly written in a memory 32 via the image processing unit 24 and the memory control unit 15 or via the memory control unit 15. The memory 32 stores image data obtained by the imaging unit 22 and converted into digital data by the A/D converter 23 or stores image data used to display an image on the display unit 28. The memory 32 has a storage capacity sufficient to store a predetermined number of still images or a predetermined duration of moving image data and audio data. Captured images are sequentially displayed using the display unit 28, thereby implementing an electronic viewfinder function (displaying an image using video see-through technology).

The memory 32 also functions as a memory (video memory) for displaying images. A digital-to-analog (D/A) converter 13 converts data for displaying an image, which is stored in the memory 32, into an analog signal and supplies the analog signal to the display unit 28. Accordingly, the image data for display, which is written in the memory 32, is sent to the display unit 28 via the D/A converter 13 for display. The display unit 28 displays an image based on the analog signal from the D/A converter 13 on a display such as a liquid crystal display (LCD).

A non-volatile memory 56 is an electrically erasable and recordable memory and may be an electrically erasable programmable read-only memory (EEPROM), for example. The non-volatile memory 56 stores constants, programs, and so on for activating the system control unit 50. The programs are programs for executing various processes in accordance with flowcharts described below in this embodiment.

The system control unit 50 is at least one processor or circuit for controlling the entirety of the digital camera 100. The system control unit 50 executes the programs recorded on the non-volatile memory 56 described above, thereby implementing processes according to this embodiment described below. A system memory 52 may be a random access memory (RAM), for example. The system memory 52 stores constants, variables, and so on for activating the system control unit 50, into which a program and so on read from the non-volatile memory 56 are loaded. In addition, the system control unit 50 controls the memory 32, the D/A converter 13, the display unit 28, and so on to further perform display control.

A mode selection switch 60, a first shutter switch 62, a second shutter switch 64, and the operation unit 70 serve as an operation unit configured to input various operation instructions to the system control unit 50. The mode selection switch 60 switches the operating mode of the system control unit 50 to any mode such as a play mode or an imaging mode in which still image data and video data are recordable.

The first shutter switch 62 is turned on by pressing the shutter button 61 on the digital camera 100 to a half-way position, or half-pressing the shutter button 61 (to provide an instruction to prepare to capture images), and generates a first shutter switch signal SW1. In response to the first shutter switch signal SW1, an operation such as auto-focus (AF) processing, auto-exposure (AE) processing, auto white balance (AWE) processing, or pre-flash (EF) processing (at least one of these processing operations is hereinafter referred to as an imaging preparation operation) is started. These processing operations are performed under control of the system control unit 50.

The second shutter switch 64 is turned on by pressing the shutter button 61 fully down, or fully pressing the shutter button 61 (to provide an instruction to capture images), and generates a second shutter switch signal SW2. In response to the second shutter switch signal SW2, the system control unit 50 starts a series of imaging processing operations including reading a signal from the imaging unit 22 and writing image data in the recording medium 200.

The operation members in the operation unit 70 are allocated appropriate functions for each scene, each of which is enabled by selecting a corresponding one of a variety of function icons displayed on the display unit 28, and act as various function buttons. The function buttons include, for example, an "End" button, a "Return" button, an "Image forward" button, a "Skip" button, a "Narrow down" button, and an "Attribute change" button. For instance, when a menu button is pressed, a menu screen including various options available is displayed on the display unit 28. A user is able to intuitively set various options by using four direction buttons and a SET button.

The controller wheel 73 is a rotatable operation member included in the operation unit 70 and is used together with the four direction buttons to specify an item to be selected.

A power supply control unit 80 is constituted by a battery detection circuit, a direct current to direct current (DC-DC) converter, a switch circuit for switching a block to be energized, and so on and is configured to determine the presence of a battery, the type of the battery, and the remaining capacity of the battery. On the basis of the determination results, the power supply control unit 80 controls the DC-DC converter in accordance with an instruction from the system control unit 50 to supply necessary voltage to each unit, including the recording medium 200, for a necessary period of time.

Figure 3:
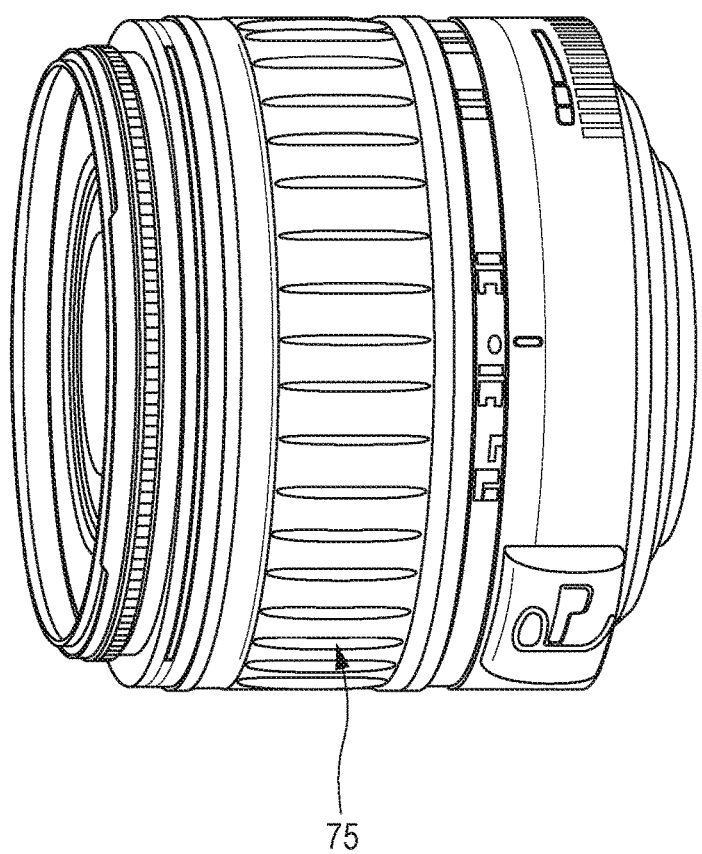
FIG. 3 is a diagram illustrating a focus adjustment switch disposed around an imaging lens.

An MF operation member 75 is a rotatable operation member for switching the focal length of the imaging lens 103 when the MF mode is set. As illustrated in FIG. 3, the MF operation member 75 is disposed around the imaging lens 103. Fundamentally, the MF operation member 75 remains disabled in the AF mode. For example, when an MF operation is performed using the MF operation member 75 after the completion of AF processing in response to the first shutter switch signal SW1, the digital camera 100 temporarily enters the MF mode such that the focus is manually adjusted by the user after the focus has been adjusted automatically. After the cancellation of the first shutter switch signal SW1 or after the completion of an imaging process in response to the second shutter switch signal SW2, the digital camera 100 returns to the AF mode from the MF mode. This function is hereinafter referred to as an AF-plus-MF (AF+MF) mode.

A power supply unit 30 includes a primary battery such as an alkaline battery or a lithium battery, a secondary battery such as a NiCd battery, a NiMH battery, or a Li battery, an alternating current (AC) adapter, and so on. An interface (I/F) 18 is an interface between the digital camera 100 and the recording medium 200 such as a memory card or a hard disk. The recording medium 200 is a recording medium such as a memory card and is constituted by a semiconductor memory, a magnetic disk, or the like.

The operation unit 70 includes, as an operation member, a touch panel (touch operation member) that is capable of sensing touch on the display unit 28. The touch panel and the display unit 28 may be formed into a single unit. For example, the touch panel, which is constructed to have high light transmittance to make the content displayed on the display unit 28 visible, is attached on top of a display surface of the display unit 28. Further, the touch panel is attached to the display unit 28 in such a manner that input coordinates on the touch panel correspond to display coordinates on the display unit 28. Thus, a graphical user interface (GUI) can be created that gives the user the opportunity to directly operate a screen displayed on the display unit 28. The system control unit 50 is capable of detecting the following events on the touch panel: touching the touch panel with a finger or a stylus (hereinafter referred to as touch-down), keeping a finger or a stylus touching the touch panel (hereinafter referred to as touch-on), moving a finger or a stylus over and in contact with the touch panel (hereinafter referred to as move), releasing a finger or a stylus from the touch panel (hereinafter referred to as touch-up), and no touch being applied to the touch panel (hereinafter referred to as touch-off). These events and the coordinates of the position at which a finger or a stylus touches the touch panel are notified to the system control unit 50 via an internal bus. The system control unit 50 determines which event has been performed on the touch panel on the basis of the notified information.

In response to a move event, a movement direction of a finger or a stylus moving over the touch panel can also be determined for each of the vertical component and the horizontal component on the touch panel on the basis of a change in the coordinates of the touched position. A series of operations including a touch-down event, followed by a certain move event, and then a touch-up event is performed, thereby enabling a stroke to be drawn. An operation of quickly drawing a stroke is called a flick. A flick is an operation of quickly moving a finger by a certain distance over and in contact with the touch panel and then lifting the finger up off the touch panel. In other words, a flick is an operation of flicking across the touch panel. When a move event over a predetermined distance or more at a predetermined speed or more is detected and then a touch-up event is detected, a flick is determined to be performed. When a move event over the predetermined distance or more at a speed less than the predetermined speed is detected, a drag is determined to be performed. The touch panel may be a touch panel based on any of various techniques such as resistive, capacitive, surface acoustic wave, infrared, electromagnetic induction, image recognition, and optical sensor techniques.

An operation according to this embodiment will be described with reference to flowcharts. The processes in the flowcharts are each implemented by the system control unit 50 executing a program recorded on the non-volatile memory 56 and loaded into the system memory 52. In the description of this embodiment, a magnification for display can be set to three levels, namely, ×1, ×5, and ×10.

In the following, a processing procedure in the AF-plus-MF mode will be described. In this embodiment, in the AF-plus-MF mode, the magnification at which an image is displayed on the display unit 28 in magnified form on the display unit 28 when the digital camera 100 is in standby for imaging (hereinafter, a magnified view during imaging standby) and the magnification at which an image is displayed on the display unit 28 in magnified form during the AF-plus-MF mode (hereinafter, a magnified view during the AF-plus-MF mode) are compared. When the magnification of the magnified view during imaging standby is higher than the magnification of the magnified view during the AF-plus-MF mode, the magnification of the magnified view during imaging standby is used as the magnification of the magnified view during the AF-plus-MF mode.

Figure 4:
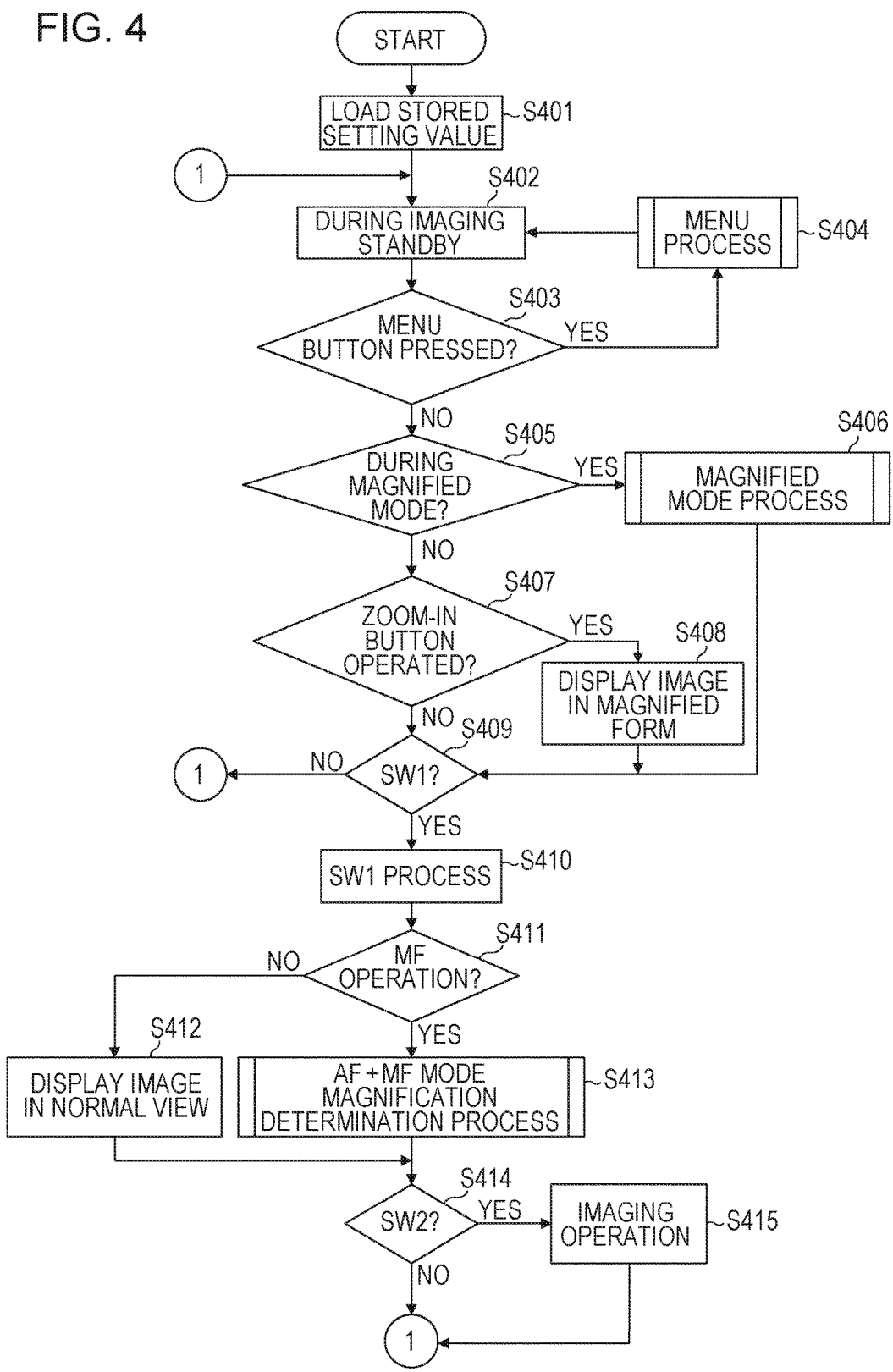
FIG. 4 is a flowchart illustrating an example procedure of a series of processes including activating power to the digital camera and capturing an image.

FIG. 4 is a flowchart illustrating an example procedure of a series of processes including activating power to the digital camera 100 and capturing an image.

The process starts when the power to the power switch 72 is turned on. Then, in S401, the system control unit 50 reads various parameters of the digital camera 100 from the non-volatile memory 56 and performs a process for initializing the operation settings of the system control unit 50. The settings to be initialized include initial settings for an image displayed in magnified form during imaging standby and initial settings for an image displayed in magnified form during the AF-plus-MF mode (hereinafter referred to as the setting of the magnification for the AF-plus-MF mode).

Then, in S402, the system control unit 50 causes the display unit 28 to display an image based on image data input via the imaging unit 22 and the like by using video see-through technology (live-view technology). At this time, operations from the first shutter switch 62, the second shutter switch 64, and the operation unit 70 are put on standby for imaging.

In S403, the system control unit 50 determines whether an operation performed by the user on a button member (menu button) assigned a function of displaying a menu screen through the operation unit 70 has been detected. As a result of the determination, if the operation performed on the menu button has been detected, then in S404, the system control unit 50 performs a menu process. The details of the menu process will be described below.

As a result of the determination in S403, if the operation performed on the menu button has been detected, then in S405, the system control unit 50 determines whether a live-view image is being displayed in a magnified mode. As a result of the determination, if the live-view image is being displayed in the magnified mode, then in S406, the system control unit 50 performs a magnified mode process. The details of the magnified mode process will be described below.

Figure 5A:
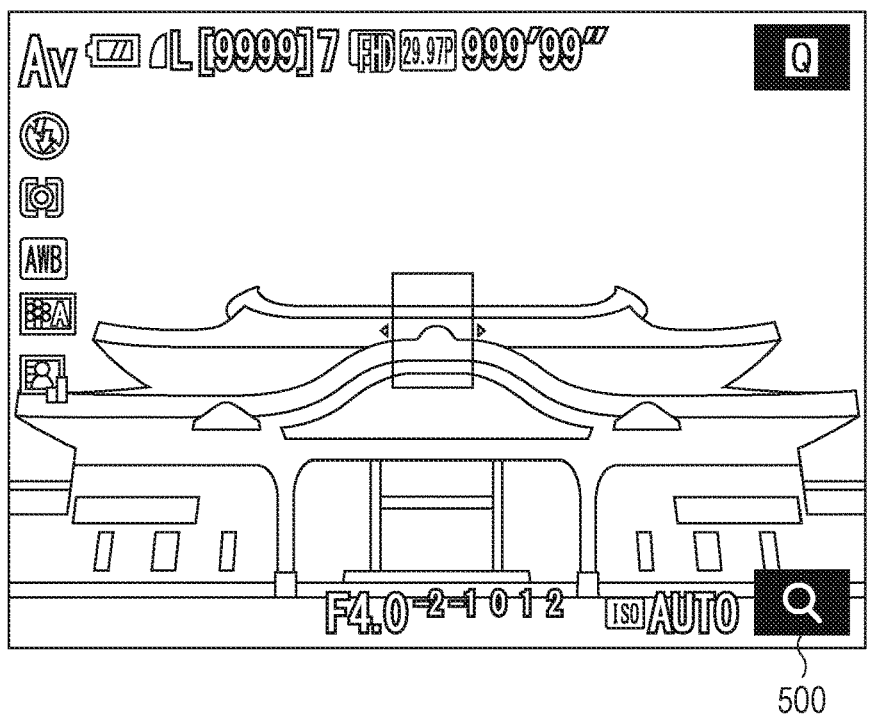
FIGS. 5A and 5B are diagrams respectively illustrating an example of a normal display screen and a magnified portion of the display screen.

As a result of the determination in S405, if the image is not being displayed in magnified form, then in S407, the system control unit 50 determines whether the user has provided an instruction to enter the magnified mode (the user has operated a zoom-in button). Specifically, the system control unit 50 determines whether a magnified mode button included in the operation unit 70 has been pressed or a zoom-in button 500 illustrated in FIG. 5A has been touched. As a result of the determination, if the presence of an instruction to enter the magnified mode has been detected, the process proceeds to S408, or the process proceeds to S409 otherwise.

In S408, the system control unit 50 displays the image, which is being displayed using live-view technology, at a magnification set in any of S705 to S707 described below. If ×5 or ×10 magnification is set, the image is magnified from ×1 magnification to ×5 or ×10 magnification for display.

Then, in S409, the system control unit 50 determines whether the first shutter switch 62 has been turned on and the first shutter switch signal SW1 has been input. As a result of the determination, if the first shutter switch signal SW1 has been input, the process proceeds to S410. In S410, the system control unit 50 performs imaging preparation processing such as the AF or AE processing described above. If the first shutter switch signal SW1 has not been input, the process returns to S402.

Then, in S411, the system control unit 50 determines whether an MF operation has been performed using the MF operation member 75. If an MF operation has been performed (the MF operation member 75 has been operated), the digital camera 100 enters the AF-plus-MF mode and then the process proceeds to S413. In S413, the system control unit 50 performs a process for determining the magnification of a magnified view in the AF-plus-MF mode. The details of this process will be described below. Further, the system control unit 50 adjusts the focus position (drives the focusing lens) in accordance with the MF operation detected in S411. If an MF operation has not been performed using the MF operation member 75, the process proceeds to S412 without causing the digital camera 100 to enter the AF-plus-MF mode. In S412, the system control unit 50 displays a normal live-view image for viewing the results of the AF processing, which is not displayed in magnified form. In this case, if an image has been displayed in magnified form during imaging standby, the system control unit 50 cancels the display of the image in magnified form.

In S414, the system control unit 50 determines whether the second shutter switch 64 has been turned on and the second shutter switch signal SW2 has been input. As a result of the determination, if the second shutter switch signal SW2 has been input, the process proceeds to S415. In S415, the system control unit 50 performs a series of imaging processing operations including reading a signal from the imaging unit 22 and writing image data in the recording medium 200. Then, the process returns to S402, and the digital camera 100 enters an imaging standby state. If an image has been displayed in magnified form before the first shutter switch signal SW1 is input (during imaging standby), the magnification at which the image has been displayed in magnified form before the first shutter switch signal SW1 is input is set again. If the second shutter switch signal SW2 has not been input and if the first shutter switch signal SW1 is no longer input (if the half-press of the shutter button 61 has been cancelled), the process also returns to S402, and the digital camera 100 enters the imaging standby state. If the second shutter switch signal SW2 has not been turned on and the first shutter switch signal SW1 is kept turned on (the shutter button 61 is kept half-pressed), the process returns to S411. When the process returns to S411, if the digital camera 100 is not in the AF-plus-MF mode, the process described above is performed (that is, the process proceeds to S413 if an MF operation has been performed, or otherwise, a normal live-view image for viewing the results of the AF processing is continuously displayed). When the process returns to S411, if the digital camera 100 has already entered the AF-plus-MF mode, the processing of S413 is not performed again and the image is still displayed at a magnification equal to the magnification determined in S413. Each time an MF operation is performed, the focus position is adjusted in accordance with the MF operation.

Figure 6:
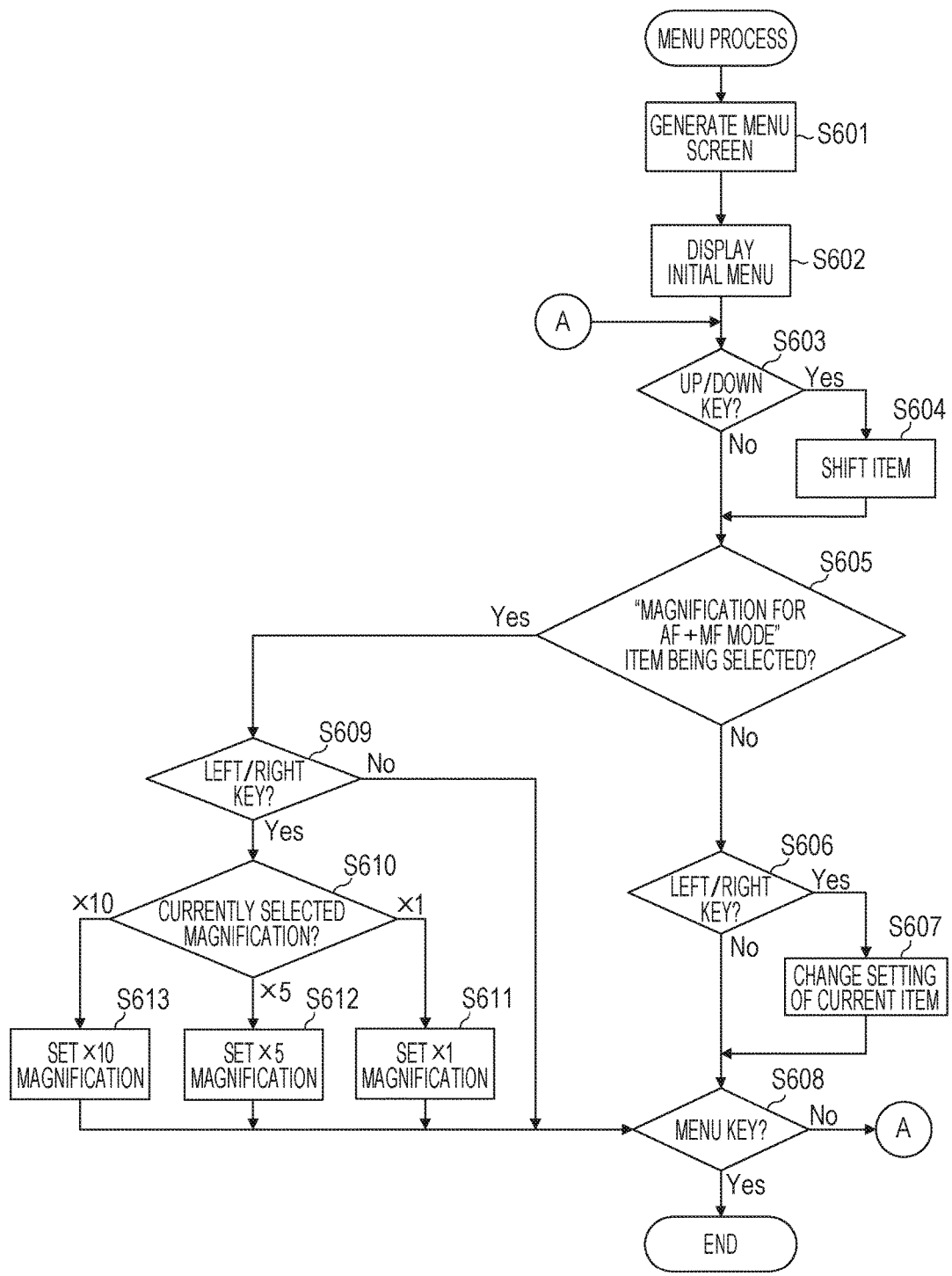
FIG. 6 is a flowchart illustrating an example detailed processing procedure of a menu process.

FIG. 6 is a flowchart illustrating an example detailed processing procedure of the menu process in S404 illustrated in FIG. 4. In this process, a description will be given of a procedure for switching the setting of the magnification for the AF-plus-MF mode to any one of ×1, ×5, and ×10.

First, in S601, the system control unit 50 generates a menu screen in accordance with a program written in the system memory 52 and sets the item currently being selected (hereinafter referred to as the current item) to the item on the top of the menu screen.

Then, in S602, the system control unit 50 transfers the data of the menu screen generated in S601 to the memory 32 and displays the menu screen on the display unit 28.

Then, in S603, the system control unit 50 determines whether an operation performed on the up or down button by the user using the four direction buttons in the operation unit 70 has been detected. As a result of the determination, if the operation performed on the up or down button has been detected, then in S604, the system control unit 50 shifts the current item over the menu screen displayed on the display unit 28 in accordance with the direction of the operation. If the operation performed on the up or down button has not been detected, the process proceeds to S605.

In S605, the system control unit 50 determines whether the current item currently being selected indicates the display setting of an imaging screen (the setting of the magnification for the AF-plus-MF mode). As a result of the determination, if the display setting of the imaging screen is being selected, the process proceeds to S609, or the process proceeds to S606 otherwise.

In S606, the system control unit 50 determines whether an operation performed on the left or right button by the user using the four direction buttons in the operation unit 70 has been detected. As a result of the determination, if the operation performed on the left or right button has been detected, the process proceeds to S607. In S607, the system control unit 50 changes the setting of the current item. If the operation performed on the left or right button has not been detected, the process proceeds to S608.

In S608, the system control unit 50 determines whether an operation performed by the user on the menu button in the operation unit 70 has been detected. As a result of the determination, if the operation performed on the menu button has been detected, the menu process in S404 illustrated in FIG. 4 ends and the process returns to S402 illustrated in FIG. 4. If the operation performed on the menu button has not been detected, the process returns to S603. Then, the system control unit 50 continuously performs the menu process.

In S609, the system control unit 50 determines whether an operation performed on the left or right button by the user using the four direction buttons in the operation unit 70 with the display setting of the imaging screen has been detected. As a result of the determination, if the operation performed on the left or right button has been detected, the process proceeds to S610, or the process proceeds to S608 otherwise.

In S610, the system control unit 50 checks the set value of the magnification that is currently being selected. As a result of the check, if the currently selected magnification is ×1, the process proceeds to S611. In S611, the system control unit. 50 stores the set value, i.e., ×1, in the system memory 52. Then, the process proceeds to S608. If the selected magnification is ×5, the process proceeds to S612. In S612, the system control unit 50 stores the set value, i.e., ×5, in the system memory 52. Then, the process proceeds to S608. If the selected magnification is ×10, the process proceeds to S613. In S613, the system control unit 50 stores the set value, i.e., ×10, in the system memory 52. Then, the process proceeds to S608.

Figure 7:
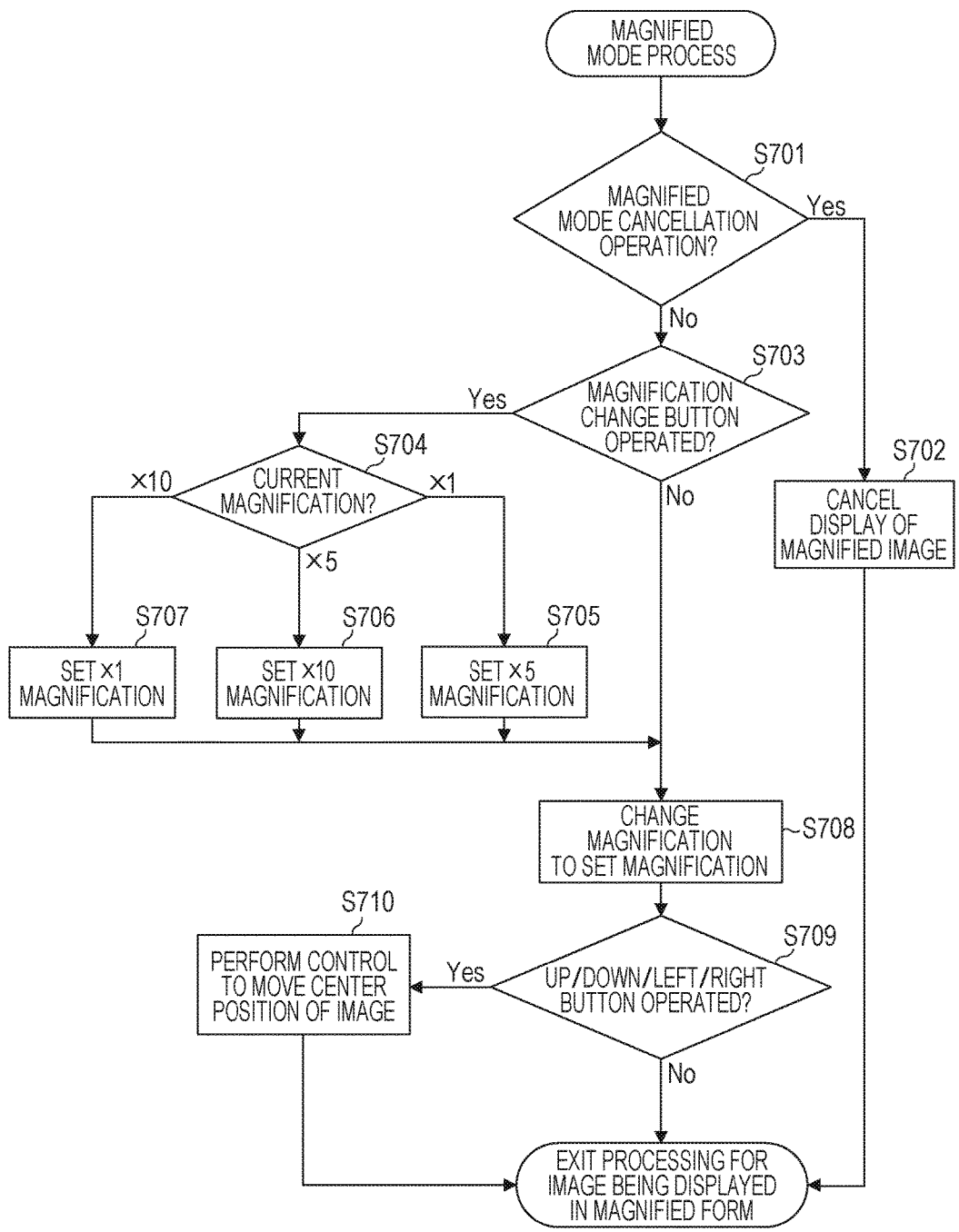
FIG. 7 is a flowchart illustrating an example detailed processing procedure of a magnified mode process.

FIG. 7 is a flowchart illustrating an example detailed processing procedure of the magnified mode process in S406 illustrated in FIG. 4.

Figure 5B:
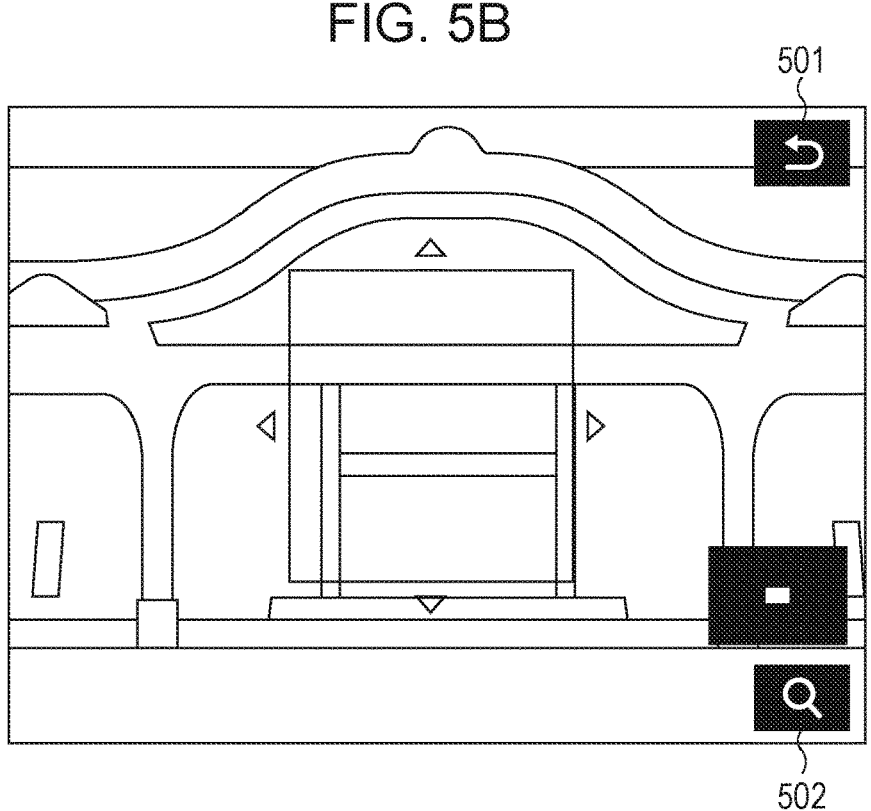

In S701, the system control unit 50 determines whether an operation of canceling the magnified mode has been performed. Specifically, the system control unit 50 determines whether the magnified mode button included in the operation unit 70 has been pressed or whether an operation performed by the user on a zoom-in cancellation button 501 illustrated in FIG. 5B, which appears on a screen currently being displayed in magnified form, for canceling the display of the image in magnified form, has been detected. As a result of the determination, if the operation of canceling the magnified mode has been detected, the process proceeds to S702. In S702, the system control unit 50 cancels the magnified mode. Then, the magnified mode process in S406 illustrated in FIG. 4 ends. If the operation of canceling the magnified mode has not been detected, the process proceeds to S703.

In S703, the system control unit 50 determines whether an instruction has been received to change the magnification of the magnified view. Specifically, the system control unit 50 determines whether a magnification change button included in the operation unit 70 has been pressed or a magnification change button 502 illustrated in FIG. 5B, which appears on the screen currently being displayed in magnified form, has been touched. As a result of the determination, if the presence of an instruction to change the magnification of the magnified view has been detected, the process proceeds to S704, or the process proceeds to S708 otherwise.

In S704, the system control unit 50 refers to the set values of magnification stored in the system memory 52 and checks the currently set magnification. As a result of the check, if the current magnification is ×1, the process proceeds to S705. In S705, the system control unit 50 sets the magnification to ×5 and stores the set value in the system memory 52. If the current magnification is ×5, the process proceeds to S706. In S706, the system control unit 50 sets the magnification to ×10 and stores the set value in the system memory 52. If the current magnification is ×10, the process proceeds to S707. In S707, the system control unit 50 sets the magnification to ×1 and stores the set value in the system memory 52.

Then, in S708, the system control unit 50 changes the current magnification to the set magnification and displays the image on the display unit 28.

Then, in S709, the system control unit 50 determines whether an operation performed on the up, down, left, or right button by the user using the four direction buttons in the operation unit 70 has been detected. As a result of the determination, if the operation performed on the up, down, left, or right button has been detected, the process proceeds to S710. In S710, the system control unit 50 causes the display unit 28 to display an image whose center position has been shifted in the direction corresponding to the operated button. Then, the processing for the image being displayed in magnified form is exited. If the operation performed on the up, down, left, or right button has not been detected, the processing for the image being displayed in magnified form is exited without any operation. As described above, through the processing procedure described above, the operation of disabling the settings for an image displayed in magnified form during the display of the image in magnified form, the operation of changing the magnification of the magnified view, and the operation of changing the position of the magnified image can be performed.

Figure 8:
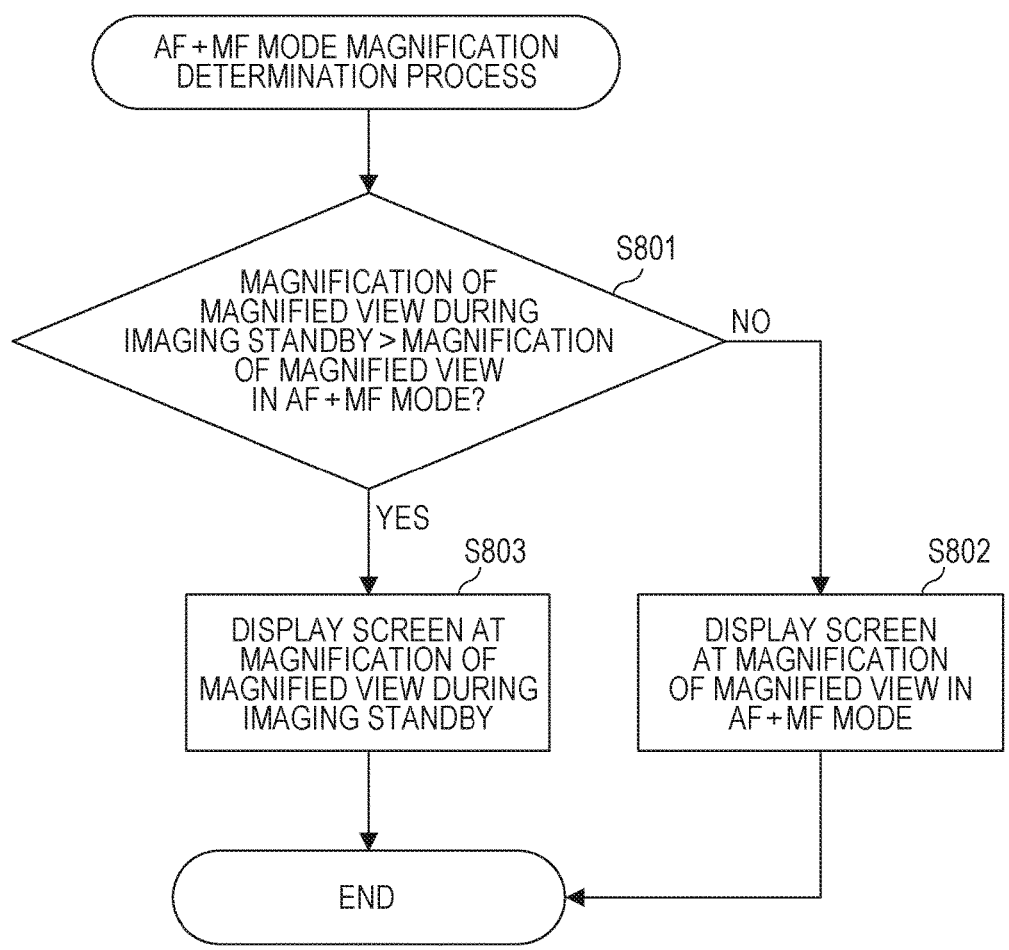
FIG. 8 is a flowchart illustrating an example detailed processing procedure according to the first embodiment for determining the magnification of a magnified view in an AF-plus-MF mode.

FIG. 8 is a flowchart illustrating an example detailed processing procedure according to this embodiment for determining the magnification of a magnified view in the AF-plus-MF mode in S413 illustrated in FIG. 4.

First, in S801, the system control unit 50 compares a set magnification of a magnified view during imaging standby (a set value of magnification at which an image is displayed in the magnified mode), which is stored in the system memory 52, and a set magnification of a magnified view in the AF-plus-MF mode. Then, the system control unit 50 determines whether the magnification of the magnified view during imaging standby is higher than the magnification of the magnified view in the AF-plus-MF mode. As a result of the determination, if the magnification of the magnified view during imaging standby is lower than or equal to the magnification of the magnified view in the AF-plus-MF mode, then in S802, the system control unit 50 displays an image on the display unit 28 at a magnification equal to the magnification set for the AF-plus-MF mode. Then, the process ends. If the magnification of the magnified view during imaging standby is higher than the magnification of the magnified view in the AF-plus-MF mode, then in S803, the system control unit 50 displays an image on the display unit 28 at a magnification equal to the magnification at which the image has been displayed during imaging standby. Then, the process ends. In this case, the image is displayed at a higher magnification than a magnification that has been set for the AF-plus-MF mode, which may annoy the user. To reduce the annoyance, an indication may be displayed on the display unit 28 which indicates that the image is being displayed at a magnification equal to the magnification at which the image has been displayed in magnified form during imaging standby since the set magnification of the magnified view during imaging standby is larger than the set magnification of the magnified view in the AF-plus-MF mode. The indication may enable the user to understand the reason that an image is being displayed at a magnification different from the set magnification without causing annoyance.

FIG. 9A illustrates relationships according to this embodiment between magnifications of a magnified view during imaging standby and magnifications of a magnified view in the AF-plus-MF mode. As illustrated in FIG. 9A, when a magnification of a magnified view during imaging standby is larger than a set magnification of a magnified view in the AF-plus-MF mode, the magnification of the magnified view during imaging standby can be used to display an image in magnified form in the AF-plus-MF mode. The magnification for normal operation may be set different from the magnification for the MF mode in which the digital camera 100 is temporarily suspended. In this case, however, when the digital camera 100 temporarily enters the MF mode with an image being displayed in magnified form during normal operation, the magnification of a magnified view in the MF mode in which the digital camera 100 is temporarily suspended may be lower than the magnification of a magnified view during normal operation. Since the display of an image in magnified form when the digital camera 100 is temporarily in the MF mode is intended for finer focusing, it is not desirable for the user that the magnification of the magnified view in the MF mode be lower than the magnification of the magnified view during normal operation. In this embodiment, accordingly, when the digital camera 100 is switched temporarily to the MF mode sequentially from an imaging standby state during which an image is displayed in magnified form, the image is displayed at a magnification equal to the magnification of the image displayed in magnified form during imaging standby if the magnification set for the MF mode in which the digital camera 100 is temporarily suspended is lower than the magnification of the image displayed in magnified form during imaging standby.

As described above, even when the focus is finely adjusted after AF has been achieved, this embodiment can prevent an image from being displayed at a lower magnification than that during imaging standby. Accordingly, when a magnification is set for the AF-plus-MF mode and the digital camera 100 enters the AF-plus-MF mode after the user has checked a subject by viewing an image displayed in magnified form during imaging standby, the user can view a screen for the AF-plus-MF mode without feeling uncomfortable, regardless of the magnification for normal display. Therefore, the user is able to comfortably capture images by using an imaging assistance function that allows temporary switching to the MF mode after the completion of preparation to capture images in the AF mode.

In the embodiment described above, an example has been described in which the determination in S801 illustrated in FIG. 8 is performed regardless of whether the magnified mode is ongoing. Alternatively, before the determination in S801, it may be determined whether an image has been displayed in the magnified mode during imaging standby, and the process may proceed to S801 if the image has been displayed in the magnified mode, or the process may proceed to S802 otherwise. That is, when an image has been displayed in magnified form in the magnified mode during imaging standby, the original magnification of the image displayed in magnified form (a magnification of a magnified view during imaging standby which is stored in the system memory 52) is compared with a magnification for the AF-plus-MF mode, and the image is displayed at the higher magnification. When the first shutter switch signal SW1 is turned on without any image being displayed in the magnified mode and the digital camera 100 enters the AF-plus-MF mode, an image is displayed at a magnification equal to the magnification for the AF-plus-MF mode, regardless of the magnification at which the image would be displayed in magnified form (regardless of magnifications of a magnified view during imaging standby which are stored in the system memory 52).

In this embodiment, furthermore, an example has been described in which the MF operation member 75 fundamentally remains disabled in the AF mode. However, even when the MF operation member 75 is operated in the AF mode, the digital camera 100 may enter the MF mode to adjust the focus position and to display a magnified image for MF operation. In this case, the magnified image for MF operation can be displayed at a magnification similar to the magnification for the AF-plus-MF mode described above. That is, a set magnification of a magnified view during imaging standby (a set value of magnification at which an image is displayed in the magnified mode) stored in the system memory 52 is compared with a magnification set in advance as the magnification of a magnified view in the MF mode, and the image is displayed at the higher magnification. Set values that have been set in advance as the magnifications of the magnified view in the MF mode may be set by the user in advance. The comparison described above may be performed only during display of a view in the magnified mode. In this case, if an MF operation is performed during display of an image in magnified form in the magnified mode and the magnification of the magnified view in the MF mode is less than or equal to the magnification of the image displayed before the MF operation, the magnification of the image displayed before the MF operation is maintained. If an MF operation is performed during display of an image in magnified form in the magnified mode and the magnification of the magnified view in the MF mode is higher than the magnification of the image displayed before the MF operation, the image is displayed in magnified form at a higher magnification than the magnification of the image displayed before the MF operation.

Second Embodiment

In the following, a second embodiment of the present disclosure will be described. In this embodiment, magnifications of a magnified view during imaging standby are associated with magnifications of a magnified view in the AF-plus-MF mode in advance so as to ensure that each of the magnifications of the magnified view in the AF-plus-MF mode is higher than or at least equal to the corresponding one of the magnifications of the magnified view during imaging standby. The configuration of a digital camera according to this embodiment is similar to that in the first embodiment and is not described herein. In the following, only the differences from the first embodiment will be discussed.

Figure 10:
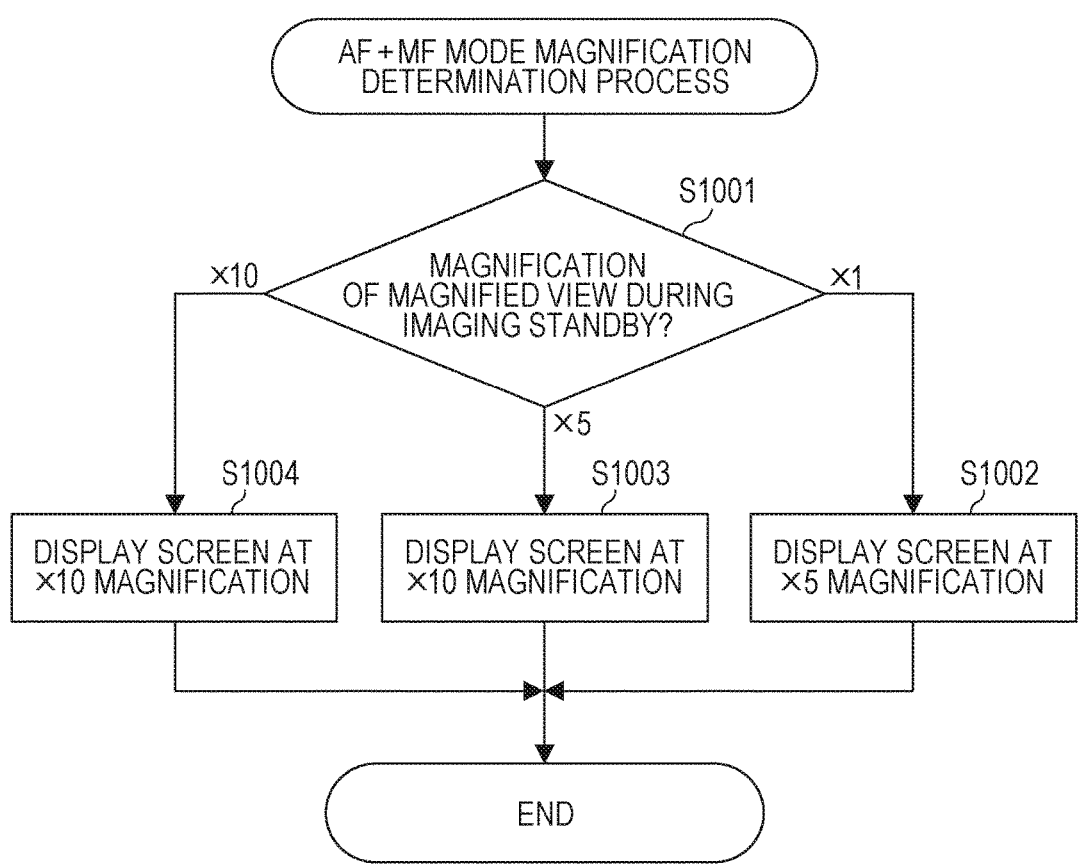
FIG. 10 is a flowchart illustrating an example detailed processing procedure according to a second embodiment for determining the magnification of a magnified view in the AF-plus-MF mode.

FIG. 10 is a flowchart illustrating an example detailed processing procedure according to this embodiment for determining the magnification of a magnified view in the AF-plus-MF mode in S413 illustrated in FIG. 4.

First, in S1001, the system control unit 50 refers to the set values stored in the system memory 52 and checks a magnification of a magnified view during imaging standby. As a result of the check, if the magnification of the magnified view during imaging standby is ×1, the process proceeds to S1002. In S1002, the system control unit 50 displays an image on the display unit 28 in magnified view at ×5 magnification. Then, the process ends. If the magnification of the magnified view during imaging standby is ×5, the process proceeds to S1003. In S1003, the system control unit 50 displays an image on the display unit 28 in magnified view at ×10 magnification. Then, the process ends. If the magnification of the magnified view during imaging standby is ×10, the process proceeds to S1004. In S1004, the system control unit 50 displays an image on the display unit 28 in magnified view at ×10 magnification. Then, the process ends.

In this embodiment, as illustrated in FIG. 10, the magnification of the magnified view in the AF-plus-MF mode is determined based on the magnification of the magnified view during imaging standby. Thus, in the menu process illustrated in FIG. 6, the magnification of the magnified view in the AF-plus-MF mode may be inhibited from being changed. Alternatively, even if the magnification of the magnified view in the AF-plus-MF mode is changed in the process illustrated in FIG. 6, the magnification of the magnified view in the AF-plus-MF mode may be determined using the process illustrated in FIG. 10.

FIG. 9B illustrates relationships according to this embodiment between magnifications of a magnified view during imaging standby and magnifications of a magnified view in the AF-plus-MF mode. As illustrated in FIG. 9B, each of the magnifications of the magnified view in the AF-plus-MF mode can be made not lower than the corresponding one of the magnifications of the magnified view during imaging standby.

As described above, even when the focus is finely adjusted after AF has been achieved, this embodiment can prevent an image from being displayed at a lower magnification than that during imaging standby. This may eliminate the need for the user to set a magnification for the AF-plus-MF mode. Accordingly, when a magnification is set for the AF-plus-MF mode and the digital camera 100 enters the AF-plus-MF mode after the user has checked a subject by viewing an image displayed in magnified form during imaging standby, the user can view a screen for the AF-plus-MF mode without feeling uncomfortable, regardless of the magnification for normal display. Therefore, the user is able to comfortably capture images by using an imaging assistance function that allows temporary switching to the MF mode after the completion of preparation to capture images in the AF mode.

Third Embodiment

In the following, a third embodiment of the present disclosure will be described. In this embodiment, a user is able to select whether to disable the setting of a magnification of a magnified view in the AF-plus-MF mode or to use a maximum magnification that can be set during imaging standby. In addition, the magnification of the magnified view in the AF-plus-MF mode is ensured to be higher than or at least equal to the magnification of the magnified view during imaging standby. In this way, this embodiment provides a setting that is easy to understand for the user. The configuration of a digital camera according to this embodiment is similar to that in the first embodiment and is not described herein. In the following, only the differences from the first embodiment will be discussed.

First, in the menu process illustrated in FIG. 6, in S610, two settings, namely, disabling a setting and setting a maximum magnification, i.e., ×10, are acceptable.

Figure 11:
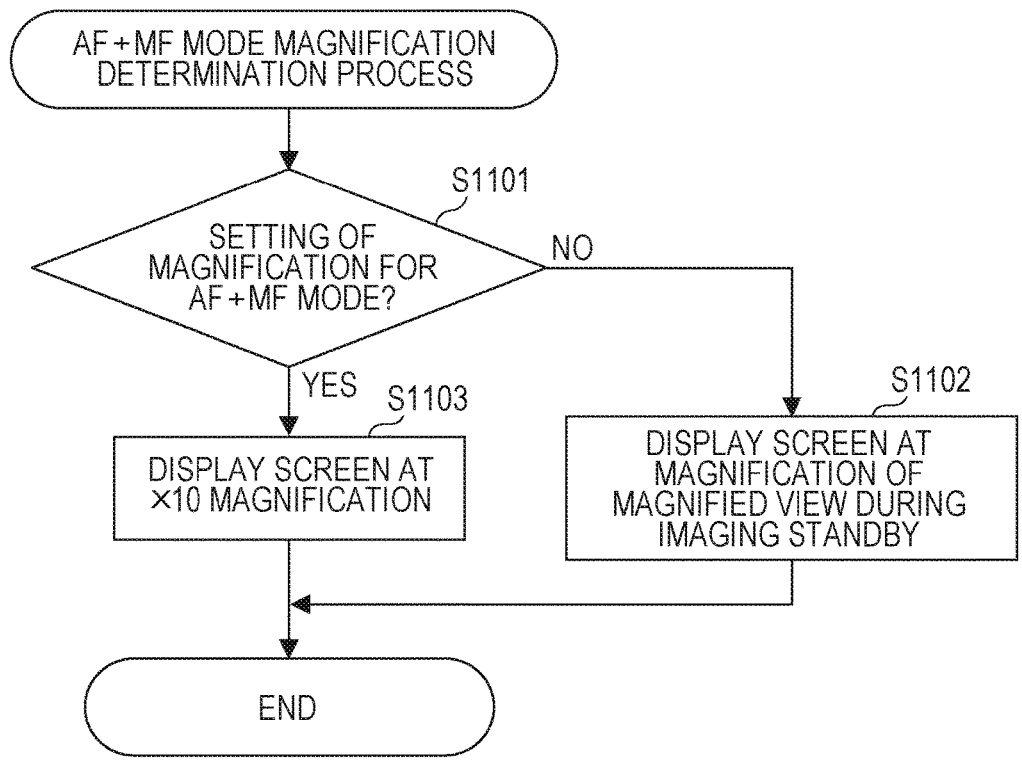
FIG. 11 is a flowchart illustrating an example detailed processing procedure according to a third embodiment for determining the magnification of a magnified view in the AF-plus-MF mode.

FIG. 11 is a flowchart illustrating an example detailed processing procedure according to this embodiment for determining the magnification of a magnified view in the AF-plus-MF mode in S413 illustrated in FIG. 4.

First, in S1101, the system control unit 50 determines, based on the set values stored in the system memory 52, whether the magnification of the magnified view in the AF-plus-MF mode is set to ×10. As a result of the determination, if the setting is disabled, the process proceeds to S1102. In S1102, the system control unit 50 displays an image on the display unit 28 at a magnification equal to the magnification of the magnified view during imaging standby. Then, the process ends. If the set value is ×10, the process proceeds to S1103. In S1103, the system control unit 50 displays an image on the display unit 28 in magnified view at ×10 magnification. Then, the process ends.

FIG. 9C illustrates relationships according to this embodiment between magnifications of a magnified view during imaging standby and magnifications of a magnified view in the AF-plus-MF mode. As illustrated in FIG. 9C, each of the magnifications of the magnified view in the AF-plus-MF mode can be made not lower than the corresponding one of the magnifications of the magnified view during imaging standby.

As described above, even when the focus is finely adjusted after AF has been achieved, this embodiment can prevent an image from being displayed at a lower magnification than that during imaging standby with a simple setting. Accordingly, when a magnification is set for the AF-plus-MF mode and the digital camera 100 enters the AF-plus-MF mode after the user has checked a subject by viewing an image displayed in magnified form during imaging standby, the user can view a screen for the AF-plus-MF mode without feeling uncomfortable, regardless of the magnification for normal display. Therefore, the user is able to comfortably capture images by using an imaging assistance function that allows temporary switching to the MF mode after the completion of preparation to capture images in the AF mode.

Fourth Embodiment

In the following, a fourth embodiment of the present disclosure will be described. In this embodiment, a set magnification of a magnified view in the AF-plus-MF mode is multiplied by the magnification of a magnified view during imaging standby so as to ensure that the magnification of the magnified view in the AF-plus-MF mode is higher than or at least equal to the magnification of the magnified view during imaging standby. The configuration of a digital camera according to this embodiment is similar to that in the first embodiment and is not described herein. In the following, only the differences from the first embodiment will be discussed.

Figure 12:
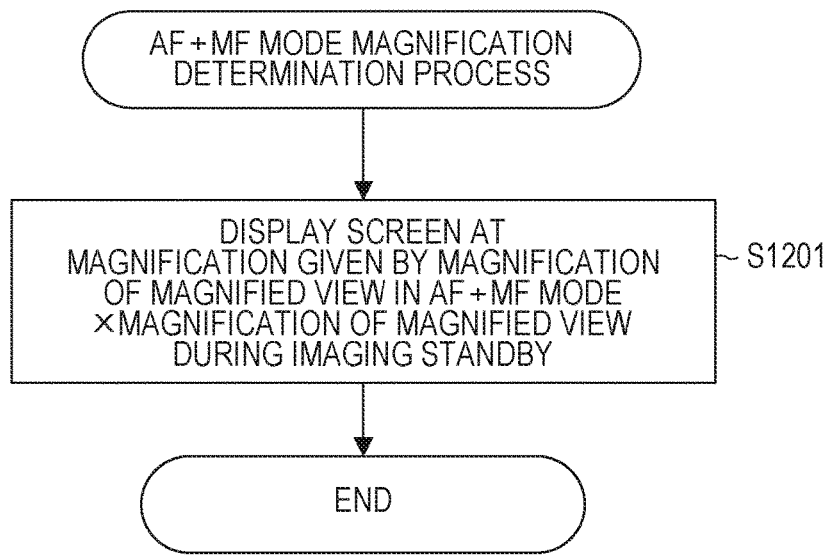
FIG. 12 is a flowchart illustrating an example detailed processing procedure according to a fourth embodiment for determining the magnification of a magnified view in the AF-plus-MF mode.

FIG. 12 is a flowchart illustrating an example detailed processing procedure according to this embodiment for determining the magnification of a magnified view in the AF-plus-MF mode in S413 illustrated in FIG. 4.

In S1201, the system control unit 50 refers to the set values stored in the system memory 52 and displays an image an the display unit 28 at a value given by multiplying a magnification of a magnified view in the AF-plus-MF mode by a magnification of a magnified view during imaging standby. Then, the process ends.

FIG. 9D illustrates relationships according to this embodiment between magnifications of a magnified view during imaging standby and magnifications of a magnified view in the AF-plus-MF mode. As illustrated in FIG. 9D, each of the magnifications of the magnified view in the AF-plus-MF mode can be made not lower than the corresponding one of toe magnifications of the magnified view during imaging standby.

As described above, even when the focus is finely adjusted after AF has been achieved, this embodiment can prevent an image from being displayed at a lower magnification than that during imaging standby. Accordingly, when a magnification is set for the AF-plus-MF mode and the digital camera 100 enters the AF-plus-MF mode after the user has checked a subject by viewing an image displayed in magnified form during imaging standby, the user can view a screen for the AF-plus-MF mode without feeling uncomfortable, regardless of the magnification for normal display. Therefore, the user is able to comfortably capture images by using an imaging assistance function that allows temporary switching to the MF mode after the completion of preparation to capture images in the AF mode.

Other Embodiments

The various types of control described above, which are performed by the system control unit 50 in the foregoing description, may be performed by a single hardware component, or a plurality of hardware components may perform the processes in a distributed way to control the entire device.

While the present disclosure has been described in detail with reference to exemplary embodiments thereof, the present disclosure is not limited to these specific embodiments and a variety of embodiments may also fall within the scope of the present disclosure without departing from the gist of the disclosure. In addition, the embodiments described above are merely exemplary embodiments of the present disclosure, and each of the embodiments may be combined with another embodiment as appropriate.

In the embodiments described above, the present disclosure is applied to, for example but not limited to, the digital camera 100. The present disclosure may be applied to any device including an imaging unit that is capable of capturing images in the AF-plus-MF mode. That is, the present disclosure may be applied to a mobile phone terminal, a tablet terminal, a smartphone, and so on. The present disclosure may also be applied to an apparatus configured to display a live-view image obtained by a digital camera or the like and received via wired or wireless communication and also configured to remotely control the digital camera (including a network camera), such as a smartphone, a tablet PC, or a desktop PC.

In an embodiment of the present disclosure, a user may be able to comfortably capture images by using an imaging assistance function that allows temporary switching to the MF mode.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-255238, filed Dec. 28, 2016, which is hereby incorporated by reference herein in its entirety.

What is claimed is:

1. An imaging control apparatus comprising:
a magnification instruction unit configured to provide an instruction to magnify a live-view image obtained by an imaging unit;
a manual focus operation unit configured to receive an operation of manually adjusting focus; and
a control unit configured to:
perform control to display the live-view image in magnified form at a first magnification in response to the instruction provided by the magnification instruction unit; and
perform control to, in response to the manual focus operation unit receiving the operation, display the live-view image at a higher magnification among the first magnification and a second magnification, the second magnification being determined in advance as a magnification at which the live-view image is displayed in response to the manual focus operation unit receiving the operation.

2. The imaging control apparatus according to claim 1, further comprising:
a selection unit configured to select the second magnification in accordance with user operation.

3. The imaging control apparatus according to claim 1, further comprising:
a comparison unit configured to compare the first magnification and the second magnification,
wherein the control unit performs control to display the live-view image at a higher magnification among the first magnification and the second magnification in accordance with a comparison result obtained by the comparison unit.

4. The imaging control apparatus according to claim 1, further comprising:
a determination unit configured to determine the first magnification in accordance with user operation to magnify the live-view image in accordance with the instruction provided by the magnification instruction unit.

5. The imaging control apparatus according to claim 1, wherein
the control unit performs control to display the live-view image in magnified form at the first magnification in response to the manual focus operation unit receiving the operation in such a manner that an indication indicating that the live-view image is displayed at the first magnification is displayed together with the live-view image.

6. The imaging control apparatus according to claim 1, further comprising:
a storage unit configured to store one or more set values of the first magnification and one or more set values of the second magnification.

7. The imaging control apparatus according to claim 1, wherein
the manual focus operation unit is capable of receiving an operation of manually adjusting focus after the imaging unit starts an imaging preparation operation, and
the imaging preparation operation includes adjusting focus by using autofocus.

8. The imaging control apparatus according to claim 7, wherein
the manual focus operation unit receives an operation of adjusting the focus from a position at which the focus is adjusted by using autofocus.

9. The imaging control apparatus according to claim 1, wherein
the control unit performs control to display the live-view image at a magnification specified by the magnification instruction unit after the imaging unit completes an imaging operation.

10. The imaging control apparatus according to claim 9, further comprising:
a storage unit configured to store one or more set values of the first magnification and one or more set values of the second magnification.

11. A control method for an imaging control apparatus including a manual focus operation unit configured to receive an operation of manually adjusting focus, the control method comprising:
a magnification instruction step of providing an instruction to magnify a live-view image obtained by an imaging unit; and
a control step of performing control to display the live-view image in magnified form at a first magnification in response to the instruction provided in the magnification instruction step, and performing control to, in response to the manual focus operation unit receiving the operation, display the live-view image at a higher magnification among the first magnification and a second magnification, the second magnification being determined in advance as a magnification at which the live-view image is displayed in response to the manual focus operation unit receiving the operation.

12. A non-transitory computer-readable storage medium storing a program for causing a computer to function as the magnification instruction unit, the manual focus operation unit, and the control unit in the imaging control apparatus according to claim 1.

13. A non-transitory computer-readable storage medium storing a program for causing a computer to function as the magnification instruction unit, the manual focus operation unit, and the control unit in the imaging control apparatus according to claim 10.

* * * * *